Dec. 15, 1959  F. FERRAR  2,917,058
EYEBROW STENCIL
Filed Dec. 12, 1957
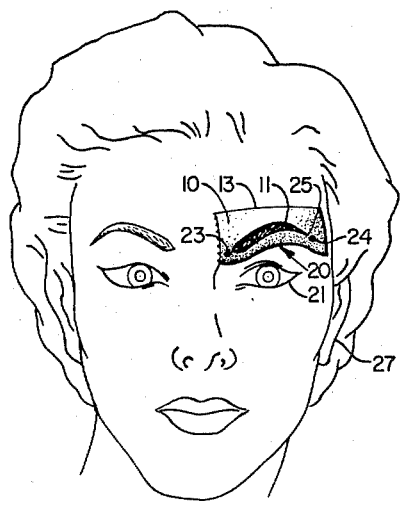
FIG. 1
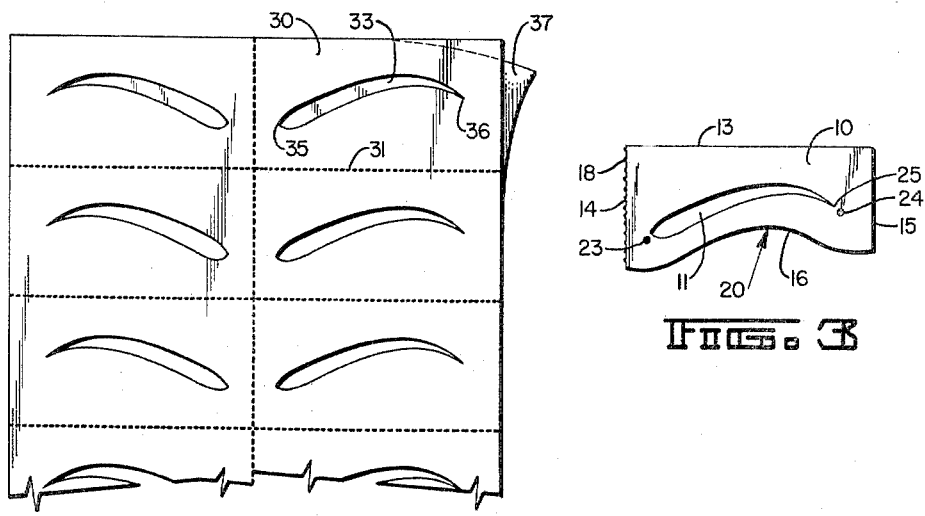
FIG. 2
FIG. 3
INVENTOR.
FRED FERRAR
BY
ATTORNEY.

United States Patent Office 2,917,058
Patented Dec. 15, 1959

2,917,058

EYEBROW STENCIL

Fred Ferrar, Hicksville, N.Y.

Application December 12, 1957, Serial No. 702,324

2 Claims. (Cl. 132—88.5)

This invention relates in general to a stencil having a cut-out portion in the form of an eyebrow so that a false eyebrow may be produced on a face by the application of eyebrow pencil in the cut-out portion.

The foremost problem which arises in connection with the application of eyebrow pencil as part of the makeup of a woman is the proper positioning of the false eyebrow, and where a stencil is used, the positioning of the stencil. While the shape of the cut-out portion of the stencil will vary according to the shape of the face of the user, proper positioning of the imitation brow is necessary no matter what the form of the brow. Such positioning must be accomplished by reference to other parts of the physiognomy, and it has been found that the eyes and ears may be utilized to effect the correct position of a penciled eyebrow.

I have discovered that a relationship may be established between an eye and/or ear and one or more fixed locations on a stencil sheet. When this relationship has been precisely established, the stencil will be in proper position for the application of eyebrow pencil. The relationship may be easily established by a user who makes the necessary adjustments of the stencil by looking in a mirror in which she can at the same time view an ear, eye and the stencil, itself.

It is, therefore, a primary object of this invention to provide an eyebrow stencil which may be easily fixed on the face in correct position for the application of eyebrow pencil.

It is another object of this invention to provide an eyebrow stencil which may be fixed on the face and removed therefrom without pulling out facial hairs on such removal.

It is still another object of this invention to provide an eyebrow stencil which, when in proper position on the face, will not interfere with movement of the eyelid beneath it.

According to the present invention, the eyebrow stencil includes a sheet of flexible material which is coated on one surface with a layer of pressure-sensitive adhesive. The sheet has a cut-out portion in the form of an eyebrow. The exact form of the eyebrow depends on the shape of the face of the woman on whom the false eyebrow is to be stenciled.

Means are provided for aligning the sheet with respect to parts of the face of the user. Such means may comprise markings near the ends of the cut-out eyebrow portion. These markings assist in positioning the sheet, one marking being aligned with an eye and another marking being aligned with an ear of the user.

In a preferred embodiment of the invention, the bottom edge of the stencil sheet is cut away. It is this edge of the stencil that lies above an eye of the user, and the cut away portion allows the eyelid of the user to move freely when the eyebrow stencil is temporarily in position on the user's face.

These and other objects, features and advantages of the invention will become more apparent when taken in connection with the illustration of the invention in the accompanying drawing, in which:

Fig. 1 shows the preferred embodiment of the invention in position on the face of a woman;

Fig. 2 is a front elevation of part of a composite sheet of a modification of the invention, and Fig. 3 is a front elevation of the preferred embodiment.

The preferred embodiment of the invention is illustrated in Figs. 1 and 3, in which is shown a stencil 10, formed from a sheet of flexible material and having a cut-out portion 11 therein in the form of an eyebrow. As shown in both Figs. 1 and 3, the cut-out portion 11 is shaped like the left eyebrow of a woman, the exact shape of the cut-out portion having been previously determined by the shape of the woman's face.

As shown, stencil 11 has four edges: a top edge 13, side edges 14 and 15, and a bottom edge 16. A plurality of stencils may be arranged in a composite sheet, such as the composite sheet of the modified invention illustrated in Fig. 2. Thus side edge 14 has perforations 18, which remain after the stencil 10 has been separated from the composite sheet.

The bottom edge 16 of the stencil 10 is cut away to form a cut away portion 20. As best seen in Fig. 1 the cut away portion 20 lies above the eye 21 of the user. Because the bottom edge 16 has been so indented, the eyelid of the user is not obstructed by the stencil and retains its freedom of movement during the stencil application.

It will be noted that there is a marking 23 near the relatively wide end portion of the cut-out portion 11, and a marking 24 near the relatively narrow end of the cut-out portion 11. These markings constitute means for aligning the stencil 10 so that the stencil may be moved to proper position. In practice, it has been found that to arrive at the proper position of the stencil, the marking 23 should be in vartical alignment with the inner corner of the eye 21. In addition, a straight line drawn through the marking 24 and the tip 25 of the narrow end of the cut-out portion 11 should, if extended, intersect the central cavity of the ear 27. With marking 23 and 24 thus aligned, the top edge 13 should be in substantially horizontal position on the forehead of the user.

A composition sheet of a modification of the invention is illustrated in Fig. 2. It will be seen that the bottom edge 31 of the stencil 30 has not been cut away, it being deemed acceptable from the standpoint of economy that a certain amount of discomfiture be endured during the brief period in which the stencil 30 is in place. While the cut-out portion 33 of the modification is the same as the cut-out portion 11 of the preferred embodiment, there are no markings in the modified form.

In this form the tips 35 and 36 of the relatively wide and relatively narrow ends, respectively, of the cut-out portion 33 serve in place of markings. Tip 35 should be in alignment with the inner corner of the eye 21, and tip 36 should point toward the central cavity of the ear 27.

Both stencils comprising the illustrated embodiments of the invention have a layer of pressure-sensitive adhesive on their under surface. Before the stencil is to be used, this layer is protected by a backing 37, seen in Fig. 2. In that figure the backing 37 has been partially removed from the stencil 30. Such removal is effected just prior to application of a stencil, so that the layer of pressure-sensitive adhesive will not have been damaged.

In practice, the preferred embodiment of the invention is utilized by first separating a stencil 10 from its composite sheet along the perforation 18. For this purpose the backing 37 may likewise be preforated. The backing 37 is removed from the stencil and the stencil 10 applied in an approximation of the proper position above the eye 21 on the face of the user.

The marking 23 is then vertically aligned with the inner corner of the eye 21, and the marking 24 is next aligned with the central cavity of the ear 27. Then an eyebrow pencil is applied in the cut-out portion 11 of the stencil 10 and the stencil removed from the face. The modification of the invention of Fig. 2 is similarly applied, except that the tips 35 and 36 of the ends of the cut-out portion 33 are used for the purpose of alignment instead of the markings 23 and 24.

It will be apparent that modifications, alterations and substitutions may be made in the heretofore described embodiments without departing from the spirit of the invention. Therefore, the invention is to be limited only by the scope of the following, appended claims.

I claim:

1. An eyebrow stencil comprising a sheet of flexible material having a cut-out portion spaced inwardly from the edges of said sheet, said cut-out portion being in the form of an elongated eyebrow having relatively wide and relatively narrow end portions, a pressure-sensitive adhesive layer on one surface of said sheet to enable said sheet to be removably held on a human face, marking on the other surface of said sheet near said wide end portion for aligning said sheet with respect to an eye of the user, and marking on said other surface near said narrow end portion for aligning said sheet with respect to an ear of the user, so that an eyebrow pencil applied in said cut-out portion will form an eyebrow in proper position on said face.

2. An eyebrow stencil comprising a sheet of flexible material having a cut-out portion spaced inwardly from the edges of said sheet, said cut-out portion being in the form of an elongated eyebrown having relatively wide and relatively narrow end portions, a pressure-sensitive adhesive layer on one surface of said sheet to enable said sheet to be removably held on a human face, and a plurality of markings on the other surface of said sheet for aligning said sheet with respect to parts of the head of the user, one or said markings being adjacent said wide end portion and another of said markings being adjacent said narrow end portion of said cut-out portion, so that an eyebrow pencil applied in said cut-out portion will form an eyebrow in proper position on said face.

References Cited in the file of this patent

UNITED STATES PATENTS

| | | |
|---|---|---|
| 1,812,425 | Woose | June 30, 1931 |
| 2,527,726 | Hendrix | Oct. 31, 1950 |
| 2,695,622 | Herod et al. | Nov. 30, 1954 |